(12) United States Patent
Klein et al.

(10) Patent No.: US 9,043,829 B2
(45) Date of Patent: May 26, 2015

(54) SYNCHRONIZATION OF USER INTERACTIVE EVENTS WITH ON-SCREEN EVENTS DURING PLAYBACK OF MULTIMEDIA STREAM

(75) Inventors: Craig Arthur Klein, San Antonio, TX (US); Gregory O. Harp, Allen, TX (US); James D. Rushing, McKinney, TX (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 1065 days.

(21) Appl. No.: 12/575,017

(22) Filed: Oct. 7, 2009

(65) Prior Publication Data

US 2011/0081965 A1   Apr. 7, 2011

(51) Int. Cl.
| | |
|---|---|
| *H04N 21/845* | (2011.01) |
| *A63F 13/30* | (2014.01) |
| *H04N 21/472* | (2011.01) |
| *H04N 21/6587* | (2011.01) |
| *H04N 21/81* | (2011.01) |
| *H04N 21/8547* | (2011.01) |

(52) U.S. Cl.
CPC ........... *A63F 13/12* (2013.01); *A63F 2300/409* (2013.01); *A63F 2300/6036* (2013.01); *H04N 21/47205* (2013.01); *H04N 21/6587* (2013.01); *H04N 21/8173* (2013.01); *H04N 21/8455* (2013.01)

(58) Field of Classification Search
None
See application file for complete search history.

(56) References Cited

U.S. PATENT DOCUMENTS

| | | | |
|---|---|---|---|
| 5,613,909 A  * | 3/1997 | Stelovsky ........................ 463/1 |
| 5,860,862 A | 1/1999 | Junkin | |
| 6,080,063 A | 6/2000 | Khosla | |
| 6,616,529 B1 | 9/2003 | Qian et al. | |
| 6,650,903 B2 | 11/2003 | Inselberg | |
| 6,699,127 B1 | 3/2004 | Lobb et al. | |
| 7,028,327 B1 * | 4/2006 | Dougherty et al. ............. 725/93 |
| 2004/0078822 A1 * | 4/2004 | Breen et al. ...................... 725/86 |
| 2005/0130725 A1 | 6/2005 | Creamer et al. | |

\* cited by examiner

*Primary Examiner* — Mark D Featherstone
(74) *Attorney, Agent, or Firm* — Guntin & Gust, PLC; Jay H. Anderson

(57) ABSTRACT

A method includes receiving, at a multimedia device, a data stream representing multimedia content, the data stream comprising first timing information for the multimedia content, and metadata representing interactive event information associated with the multimedia content, the metadata comprising second timing information for the interactive event information. During the playback of the multimedia content, a first user interactive event is identified that is associated with a first time point in the playback of the multimedia content based on the interactive event information, and the first user interactive event is performed concurrent with the first time point in the playback of the multimedia content.

22 Claims, 6 Drawing Sheets

SYNCHRONIZATION OF USER INTERACTIVE EVENTS WITH ON-SCREEN EVENTS DURING PLAYBACK OF MULTIMEDIA STREAM

FIELD OF THE DISCLOSURE

The present disclosure generally relates to multimedia content distribution, and relates more particularly to providing user interactive events during playback with multimedia content.

BACKGROUND

Service providers can offer users a variety of viewing options for different multimedia programs. For example, the service providers can supply users with real-time television programs that are typically available for the users to watch only at a specific date and time. The service providers can also offer the users on-demand multimedia content that is available for an extended amount of time and that is provided to the users upon request of the on-demand movie.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred example embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

For ease of discussion, the techniques of the present disclosure are illustrated in the example context of a packet-based network architecture (such as the Internet or a private Internet Protocol (IP)-based network) utilized to convey information between end-user devices, content sources, media servers, and other components of the network. However, these techniques are not limited to this example, but instead can be implemented in any of a variety networks configured to support the transmission of multimedia content and other information using the guidelines provided herein without departing from the scope of the present disclosure. Likewise, the techniques of the present disclosure are described with reference to a single end-user multimedia device. However, it will be appreciated that a telecommunications network may support a number of end-user multimedia devices and thus the described techniques can be employed in parallel for some or all of the end-user multimedia devices within the telecommunications network.

Figure 1:
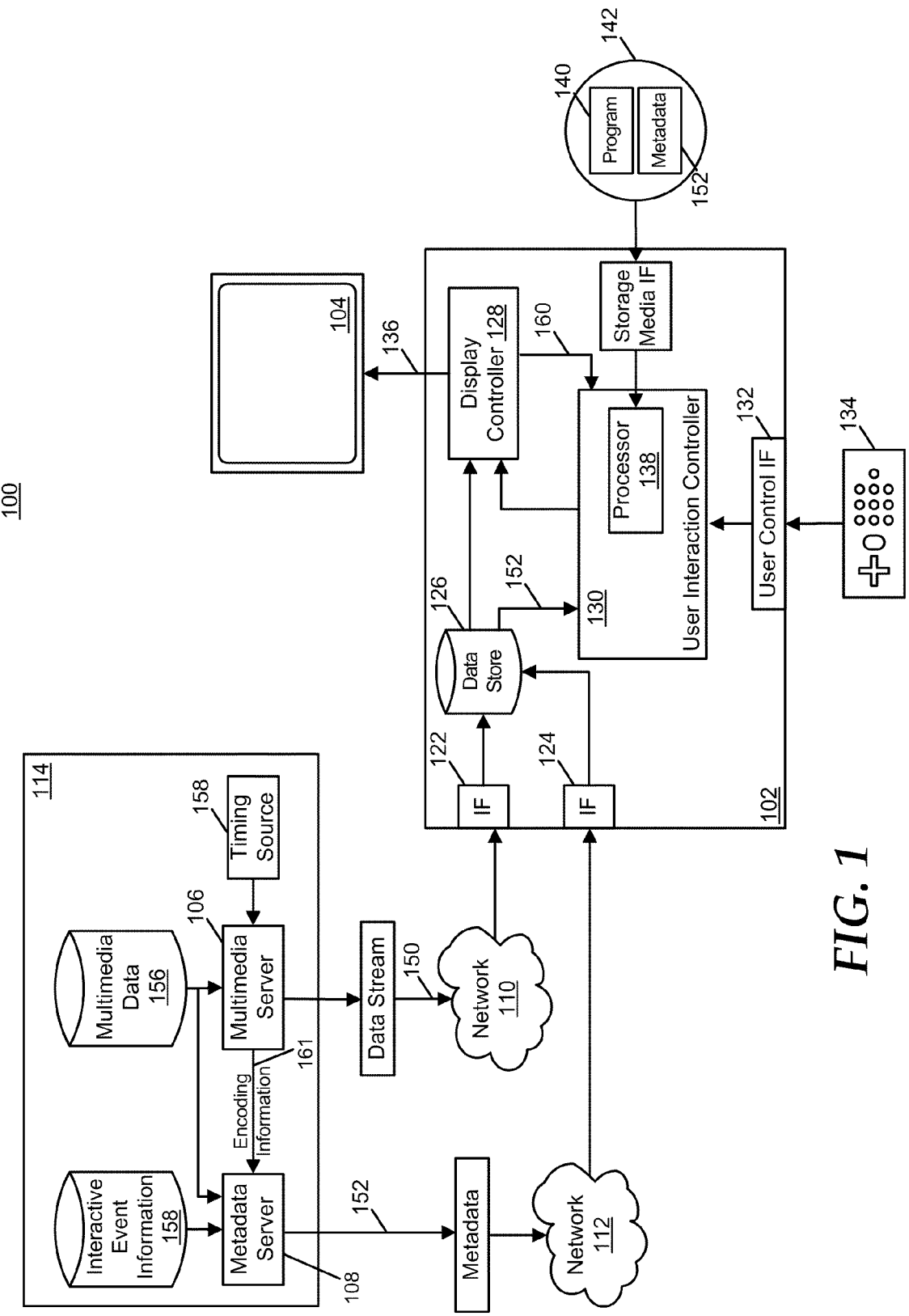
FIG. 1 is a diagram illustrating a multimedia system providing synchronization between on-screen events and corresponding user interaction events in accordance with at least one embodiment of the present disclosure.

FIG. 1 illustrates an example multimedia system 100 configured to utilize a data stream representing multimedia content and metadata associated with the multimedia content to provide users with an interactive experience that is more fully synchronized to on-screen events of interest in accordance with at least one embodiment of the present disclosure. The multimedia system 100 includes an end-user multimedia device 102 and a display device 104 at a user's premises. The multimedia device 102 can include, for example, a set top box (STB) device, a digital video recorder (DVR) device, a video game console, a portable multimedia device (such as a multimedia-enable cellular phone, a digital radio receiver, or a handheld video game console), and the like. The multimedia system 100 further includes a multimedia server 106 and a metadata server 108 connected to the multimedia device 102 via networks 110 and 112, respectively. The networks 110 and 112 can include packet-based networks such as a local area network (LAN), a wireless network an Internet Protocol (IP)-based provider network, or the Internet. Further, the networks 110 and 112 can comprise the same network or different networks. In the example of FIG. 1, the multimedia server 106 and the metadata server 108 are provided in association with the same service provider 114 such as a cable or satellite television provider. As such, the networks 110 and 112 may be implemented as the same provider network connecting the service provider 114 to the multimedia device. Alternately, the multimedia server 106 and the metadata server 108 may be maintained and operated by separate service providers via the same or different networks.

In the illustrated example, the multimedia device 102 includes a network interface 122 to the network 110, a network interface 124 to the network 112, a data storage component 126, a display controller 128, a user interaction controller 130, a user control interface 132, and a user input device 134. The network interfaces 122 and 124 can include, for example, an Ethernet interface, a wireless interface, a fiber-optic interface, and the like. In instances where the network 110 and the network 112 are the same network, the network interfaces 122 and 124 can together comprise a single network interface. The data storage component 126 can include any of a variety of storage components, such as a hard drive, an optical drive, a random access memory (RAM), flash memory, a cache, and the like.

The display controller 128 is configured to access a data stream stored or buffered in the data storage component 126 to generate a corresponding audio/video signaling 136 representative of a playback of the multimedia content of the data stream. Accordingly, the display controller 128 therefore can implement a decoder (such as a digital television (DTV) decoder, an H.264 decoder, or an MPEG decoder), a video display driver, and other such components utilized in processing data streams to generate corresponding audio/video signaling 136.

The user interaction controller 130 is configured to access metadata stored or buffered in the data storage component 126 (or an alternate storage component) to identify interactive event information associated with corresponding time points in multimedia content being presented by the display controller 128, and to perform one or more user interactive events associated with the identified interactive event information. In performing these user interactive events, the user interaction controller 130 may seek input from the user via the user input device 134. In a context where the multimedia device 102 includes a set-top box or DVR, the user input device 134 can include, for example, a remote control device or a keyboard device. In a context where the multimedia device 102 includes a video gaming console, the user input device 134 can include, for example, a video game controller or handset (that is, a "joystick"). In one embodiment, the user interaction controller 130 is implemented at least in part as one or more processors 138 that execute a software program 140, whereby the software program 140 includes a set of executable instructions that manipulate the one or more processors 138 to perform at least a subset of the functionality of the user interaction controller 130 described herein. The software program 140 can be stored locally at the multimedia device 102, such as in the data storage component 126 or other data storage component. In another embodiment, the software program 140 is stored in portable storage medium 142, and the one or more processors 138 access the software program 140 from the portable medium 142 via a portable storage interface 142. To illustrate, in a context where the multimedia device 102 is implemented as a video gaming console, the software program 140 can implement a video game application and the portable medium 142 can include an optical disc, a Universal Serial Bus (USB)-based flash memory, or a video game cartridge.

In operation, the multimedia system 100 provides a data stream 150 and metadata 152 to the multimedia device 102. The data stream 150 preferably includes data representative of multimedia content to be played back by the multimedia device 102 via the display device 104. The metadata 152 preferably includes interactive event information corresponding to certain on-screen events of interest in the multimedia content, whereby the multimedia device 102 uses this interactive event information to perform user interactive events in conjunction with the on-screen events. In order to permit the user interactive events to be synchronized to the occurrences of the corresponding on-screen events during the playback of the multimedia content, the data stream 150 and the metadata each includes timing information that is used by the multimedia device 102 to identify the approach of an on-screen event as the playback of the multimedia content progresses and then identify a user interactive event to be performed concurrent with the on-screen event based on corresponding interactive event information in the metadata 152.

In order to provide the data stream 150 to the multimedia device 102, the multimedia system 100 stores multimedia data representative of the multimedia content in a storage component 156. Upon some triggering event, the multimedia server 106 accesses the multimedia data from the storage component 156 and encodes it for transmission or provision to the multimedia device 102 as the data stream 150. As part of this encoding process, the multimedia server 106 inserts timing information into the data stream 150 based on timing indicators from a timing source 158, whereby the inserted timing information permits the multimedia device 102 to identify a relative time of playback for each corresponding portion of multimedia content. In at least one embodiment, this timing information is inserted into the data stream 150 in the form of time stamps interspersed substantially equally throughout the data stream 150, whereby the time stamps may be inserted into the header of packets of the data stream 150, as separate time stamp packets, and the like. Further, in one embodiment, the time indicators in the time stamps can be based on a well-known timing source, such as Coordinated Universal Time (also commonly referred to as Temps Universel Coordonné). The frequency at which the time stamps are inserted typically is sufficient to ensure that synchronization can be maintained within, for example, a few seconds of the beginning of a playback of the multimedia content, a tuning event, a trickplay event such as pause/resume/fast-forward/reverse, or the like. To illustrate, a time stamp may be inserted into the data stream 150 such that a new time stamp is encountered every few seconds in the processing of the data stream 150 at the multimedia device 102 for playback of the corresponding multimedia content. Further, the time indicators represented by the time stamps can include either absolute time indicators or relative time indicators that reference an elapsed time from a start of the playback. The implementation of the timing information in the data stream 150 is described in greater detail herein with reference to FIGS. 2-6.

The form and content of the metadata 152 is based on the relevant aspects, situations, events and other circumstances of the multimedia content represented in the data stream 150. To illustrate, when the multimedia content represents a televised sports game, the interactive event information of the metadata 152 can include, for example, scoring updates and the relative times that each corresponding change in the score occurred. The interactive event information further can include other dynamic information for the sports game, such as the number of strikes and balls at any given time for a televised baseball game, which down and the number of yards to go for a televised football game, and the like. As described in greater detail below, the multimedia device 102 can implement an on-screen display (OSD) that overlies the video content of the sports game as it is being displayed on the display device 104, whereby the on-screen display provides the current score and other statistics regarding the sports game as it progresses. In this implementation, the multimedia device 102 can utilize the interactive event information of the metadata 152 to modify the on-screen display as the playback of the sports game progresses to reflect the changes in the score and other statistics as they occur in the playback of the sports game. As another example, when the multimedia content represents a televised concert, the interactive event information of the metadata 152 can include, for example, the notes played on the instrument of a particular band member, and the timing of each note. As described in greater detail below, the multimedia device 102 can implement a video game application executed concurrent with the playback of the multimedia content. In this implementation, the video game application can include a musical band video game, such as one similar to the Guitar Hero™ video game or the Rock Band™ video game, and the multimedia device 102 can use the note information to permit a user to attempt to "play" the same song with the same notes through the video game application.

This concurrent implementation of the user interactive events with the corresponding on-screen events in the playback of the multimedia content benefits from synchronization between the timing of the on-screen events and the interactive event information used to implement the corresponding user interactive events. Accordingly, in providing the metadata 152, the metadata server 108 identifies an on-screen event of interest in the multimedia content and identifies the timing information associated with the on-screen event. In one embodiment, the timing information associated with the on-screen event is obtained by the metadata server 108 from encoding information 161 provided by the multimedia server 106 during the final encoding process of the data stream 152 in which the multimedia server 106 inserts the timing information for the data stream 152. For an identified on-screen event of interest, the metadata server 108 then accesses a storage component 158 to obtain interactive event information relevant to the on-screen event and combines or otherwise associates the obtained interactive event information with a corresponding timing indicator synchronized to the timing of the data stream 152 to form a corresponding data packet or other data structure of the metadata 152. The implementation of the timing information in the metadata 152 is described in greater detail herein with reference to FIGS. 2-6.

The interactive event information associated with multimedia content can be obtained in any of a variety of ways. To illustrate, one or more instruments or other input devices can be used to obtain information regarding the circumstances of the activity as it is being recorded in real-time. For example, assume an automotive race is being filmed as the multimedia content. During the filming, instruments and other devices, such as wind gauges, fuel monitors, lap count monitors, and the like, may be taking periodic measurements as the race progresses. The measurements from these instruments and devices, along with timing information associated with each measurement, then may be stored in the storage component 158 in association with the corresponding multimedia data representing the recorded automotive race. In other instances, a technician or an automated process may review the recorded content after recording has completed and then generate the corresponding interactive event information based on the review. To illustrate, assume a golf game has been filmed and recorded. In this case, a technician can review a playback of the golf game and use this playback, along with information accessed from other sources, to generate a data file containing, for example: the sequence in which the golf players played each hole; the number of strokes each golf player took for each hole; the distance, direction, and landing point of each stroke and the time at which each stroke occurred; the humidity and other weather conditions at the golf course at various points throughout the tournament; the length of the grass at each fairway and green; and the like. The data representative of this information then may be stored in the storage component 158 in association with the corresponding multimedia data representing the recorded golf game.

It will be appreciated that the raw timing information associated with the interactive event information may not be synchronized to the timing source 158. To illustrate, measurements, scores, or other quantifiers may have been stored with timing references indicative of an elapsed time since the measuring device was powered-up or otherwise initiated or the timing references may be tied to a local time source, whereas the timing information implemented in the data stream 150 may be directly tied to an absolute time reference, such as the Coordinated Universal Time. Accordingly, in generating the metadata 152 from the stored interactive event information, the metadata server 108 may reformat or adjust the timing information of the interactive event information to relate to the same timing reference as the data stream 150, rather than in relation to another timing source. To illustrate, if the timing information of the interactive event information is configured relative to elapsed times from some particular starting point, the metadata server 108 may determine the particular point in the Coordinated Universal Time for that particular starting point and then reformat the successive time indicators relative to this particular point in the Coordinated Universal Time.

After receiving the data stream 150, the multimedia device 150 can initiate a playback of the multimedia content represented by the data stream 150 in response to, for example, user input requesting the playback. In response to such user input, the display controller 128 accesses the data stream 150 and processes the data stream 150 for playback of the multimedia content. The processing by the display controller 128 can include, for example, decoding and decrypting encoded video and audio information. As the playback progresses, the display controller 128 can provide progress information 160 indicating the current position or progress of the playback of the multimedia content to the user interactive controller 130. This progress information 160 can include, for example, the timing indicators included in the time stamps embedded in the data stream 150. Thus, as each time stamp is encountered by the display controller 128 during playback of the multimedia content of the data stream 150, the display controller 128 can output the timing indicator of the time stamp, or a representation thereof, to the user interaction controller 130.

The user interaction controller 130 uses the progress information 160 to determine whether the playback of the multimedia content by the display controller 128 is approaching an identified on-screen event of interest. When an identified on-screen event of interest is approaching or reached in the playback, the user interaction controller 130 accesses the subset of the stored interactive event information that is associated with the identified on-screen event and performs one or more user interactive events based on the accessed interactive event information. The user interactive events can include or result in video content 162 to be displayed at the display device 104 in association with the identified on-screen event. To illustrate, if the multimedia content represents a sports game and the on-screen event is a scored goal by one team at a particular point in time of the playback, the user interactive event can include, for example, an update to a displayed score of an OSD provided by the user interaction controller 130 at or following the particular point in time of the playback. The user interactive events also can include or result in the playback of a video game experience that emulates a situation or other conditions present in the playback of the multimedia content at that particular point in time. To illustrate, the multimedia content may represent a band playing a particular song and the multimedia device 102 may implement a musical play-along game application whereby the user is presented the opportunity in the game application to manipulate the user input device 134 to emulate a note played by a guitarist in the band at the same time that the guitarist plays the note in the playback of the concert recording at the multimedia device 102. This process of progressing through the playback of the multimedia content, identifying on-screen events of interest, and then performing corresponding user interactive events concurrent with the occurrence of the on-screen events in the playback can continue until the playback is completed.

In order to implement the above-described process, the multimedia device 102 may need access to at least a current portion of the data stream 150 and the relevant portion of the metadata 152. The data stream 150 may be provided to the multimedia device 102 in a variety of manners. The data stream 150 may be transmitted from the multimedia server 106 to the multimedia device 102 for a "live" or real-time playback as the recorded event occurs (with some degree of time-shifting to allow for the above-described encoding, processing, and buffering of the multimedia data). Alternately, the data stream 150 may be provided as a pre-recorded broadcast from the multimedia server 106 to the multimedia device 102, whereby the multimedia device 102 initiates playback of the multimedia content of the data stream 150 as soon as the data stream 150 is received. The data stream 150 also may be provided from the multimedia server 106 to the multimedia device 102 as an on-demand transmission such as a video-on-demand (VoD) transmission. Alternately, the data stream 150 may be transmitted to the multimedia device 102, whereupon the multimedia device 102 operates as a digital video recorder (DVR) and stores the data stream 150 for subsequent playback at a later time.

In one embodiment, the metadata 152 is provided to the multimedia device 102 in parallel with the data stream 150. For example, the metadata server 108 may provide the metadata 152 to the multimedia server 106, which then embeds the metadata 152 into the data stream 150. However, while at least a portion of the metadata 152 is needed by the multimedia device 102 to implement user interactive events synchronized to corresponding on-screen events, the metadata 152 need not be provided to the multimedia device 102 in parallel with the provision of the data stream 150. To illustrate, the multimedia device 102 may receive and store the data stream 150. In response to storing the data stream 150, or in response to initiating playback of the data stream 150, the multimedia device 102 can then fetch the metadata 152 from the metadata server 108 using, for example, a File Transfer Protocol (FTP) or a Hypertext Transport Protocol (HTTP) and store the fetched metadata 152 at the storage component 126. A pointer or other reference to the particular location of the metadata 152 can be implemented in the data stream 150. To illustrate, the data stream 150 can include an IP address of a FTP server or an HTTP server and an identifier of the file at the FTP server of HTTP server that stores the metadata 152. In response to accessing the data stream 150 to begin processing the data stream 150 for playback, the user interaction controller 130 or other component of the multimedia device 102 can access the IP address and identifier of the file and initiate a transfer of the file from the server at the identified IP address.

In another embodiment, rather than receiving the metadata 152 at the multimedia device 102 via a network (such as by receiving the metadata 152 as part of a broadcast or multicast or by obtaining the metadata 152 as downloadable content from a file transfer protocol (FTP) server or other type of content server), the metadata 152 is provided to the multimedia device 102 via a portable storage medium, such as on an optical disc, a removable flash drive, a video game cartridge. As discussed above, the multimedia device 102 can include a video game console that implements a video game application represented by a software program 140 stored on a portable storage medium 142. In this instance, the portable storage medium 142 also may store the metadata 152, which is then accessed by the multimedia device 102 via the portable storage interface 144. Likewise, instead of providing the data stream 150 to the media device 102 via a network, the data stream 150 instead can be provided via a portable storage medium, either together with the metadata 152 (and the software program 140) or as a separate portable storage medium. To illustrate, an optical disc may be provided for use by the multimedia device 102, whereby the optical disc includes the data stream 150 representing a sports game for playback by the display controller 128, and the software program 140 and metadata 152 for execution by the user interaction controller 130 to provide a video game application that emulates the dynamic conditions of the sports game as the playback of the sports game progresses.

Figure 2:
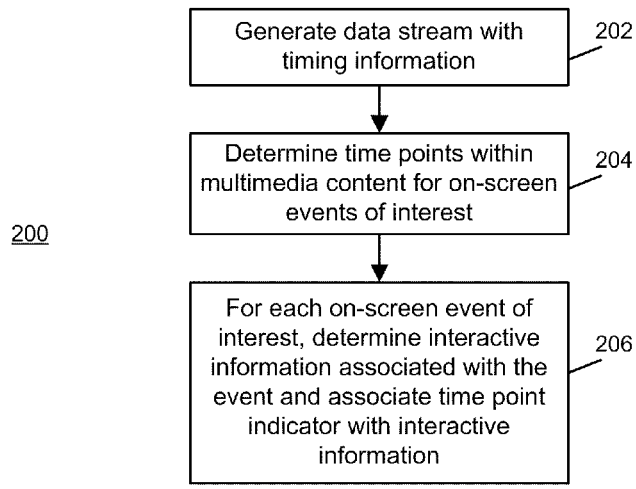
FIG. 2 is a flow diagram illustrating a method for generating metadata in association with multimedia content in accordance with at least one embodiment of the present disclosure.

FIG. 2 illustrates an example method 200 for generating the data stream 150 and the metadata 152 of the multimedia system 100 in accordance with at least one embodiment of the present disclosure. At block 202, the multimedia server 106 accesses multimedia data from the storage device 156 and encodes the multimedia data with timing information based on the timing source 158. As discussed above, this encoding process can include inserting time stamps into the multimedia data at periodic intervals, where the time stamps may include time indicators related to the Coordinated Universal Time. At block 204, on-screen events of interest in the multimedia content and their corresponding time points are identified. This identification of the on-screen events may be performed by a technician reviewing a playback of the multimedia content, by an automated process or any combination thereof. At block 206, interactive event information for each on-screen event of interest is determined and the interactive event information is then included in the metadata 152 along with an associated time point indicator. The process of blocks 204 and 206 can be performed concurrently with, or subsequent to, the process of block 202.

Figure 3:
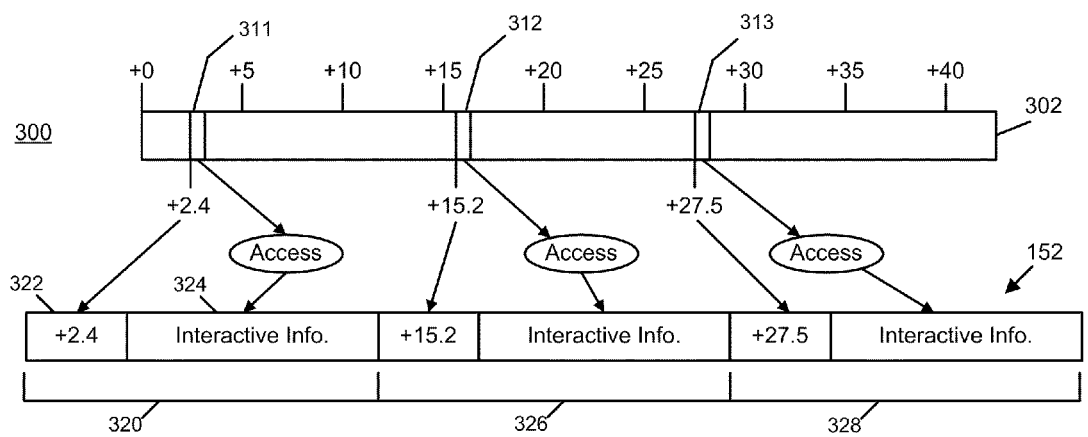
FIG. 3 is a diagram illustrating an example implementation of the method of FIG. 2 in accordance with at least one embodiment of the present disclosure.

FIG. 3 illustrates an example of the metadata 152 generated in accordance with the method 200 of FIG. 2. The bar 302 of FIG. 3 represents the playback sequence of multimedia content of the data stream 150. In the depicted example, the data stream 150 includes time stamps periodically dispersed within the playback sequence, initiating with a starting time indicator of +0 and continuing in 5 unit intervals (+5, +10, +15, and so forth. Identified in the illustrated data stream 150 are three on-screen events: on-screen event 311 at time point +2.4; on-screen event 312 at time point +15.2; and on-screen event 313 at time point +27.5. The data stream 150 is provided to the metadata server 108 for processing. In response to the identified on-screen event 311, the metadata server 108 accesses the storage device 158 to determine the corresponding interactive event information and then the metadata server 108 generates a metadata packet 320 for the metadata 152. The metadata packet 320 includes a time stamp field 322 and a data field 324. The time stamp field 322 stores a time indicator representative of the time point +2.4 and the data field 324 stores the interactive event information accessed in relation to the on-screen event 311. This process is repeated for the on-screen events 312 and 313 to result in metadata packets 326 and 328, respectively, for the metadata 152.

Figure 4:
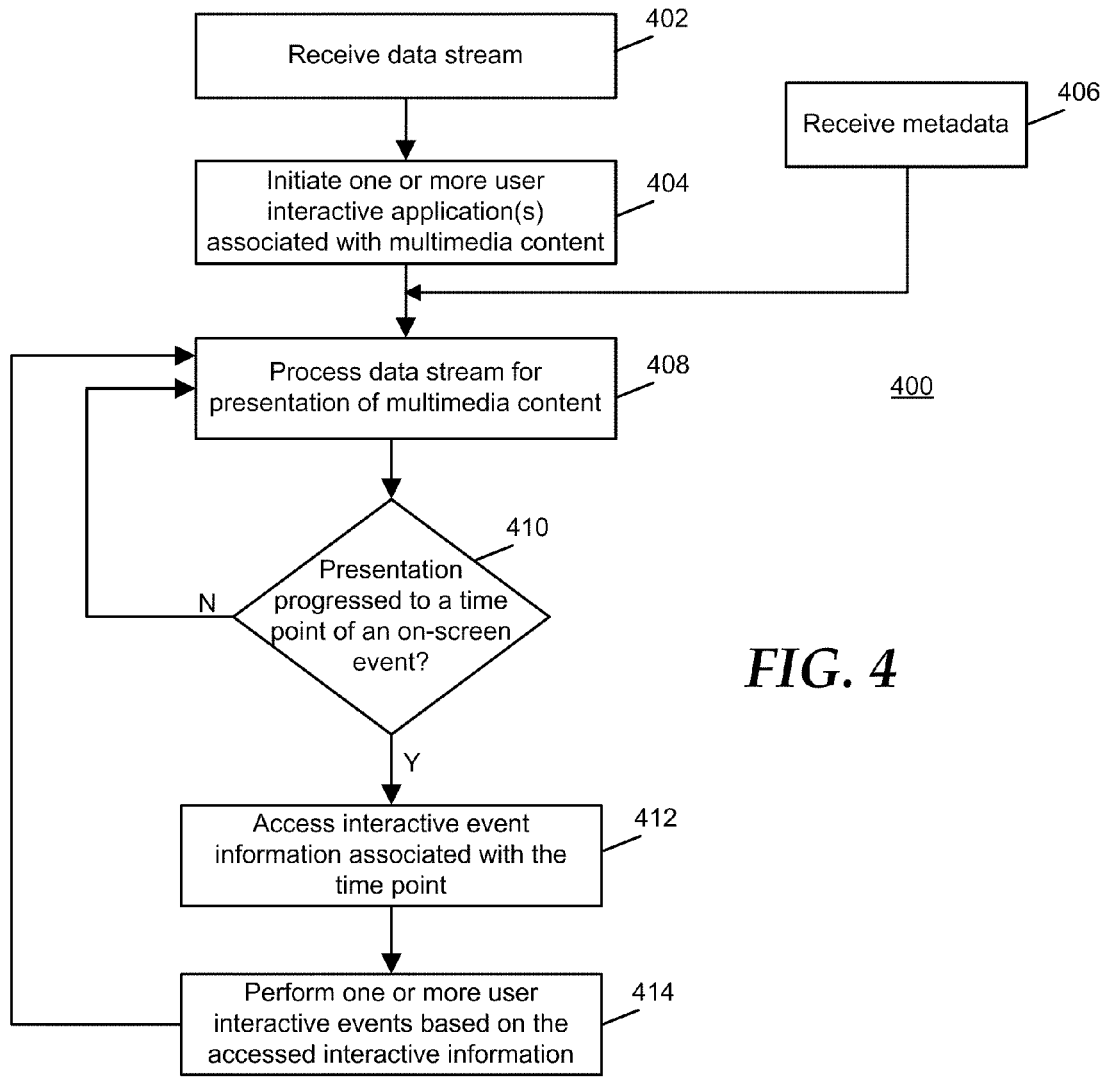
FIG. 4 is a flow diagram illustrating a method for synchronizing user interaction events with corresponding on-screen events during playback of multimedia content by a end-user multimedia device in accordance with at least one embodiment of the present disclosure.

FIG. 4 illustrates an example method 400 for synchronizing user interactive events with corresponding on-screen events during a playback of multimedia content at the multimedia device 102 in accordance with at least one embodiment of the present disclosure. At block 402 the multimedia device 102 receives the data stream 150. As noted above, the data stream 150 can be transmitted from the multimedia server 106 to the multimedia device 102 as a live or real-time broadcast, as a pre-recorded broadcast, as a VoD transmission, a prerecorded playback, and the like. Alternately, the data stream 150 can be made accessible to the multimedia device 102 via a portable storage medium, such as an optical disc or a flash memory device. As also noted above, the data stream 150 includes timing information associated with the multimedia content.

At block 404, the multimedia device 102 initiates one or more user interactive applications associated with the multimedia content of the data stream 150. The user interactive applications can include, for example, a video game application for providing a video game experience that emulates the circumstances present in the multimedia content. As another example, the user interactive applications can include an on-screen display application to provide an on-screen display that overlies the display for the multimedia content, whereby the on-screen display can include dynamically updated scores, statistics, quantifiers, and other information pertaining to the displayed multimedia content. The user interactive applications can be implemented as solely hardware such as an application-specific integrated circuit (ASIC) or state machine as one or more processors 138 and software programs 140 executed by the one or more processors 138, or combinations thereof. The initiation of the one or more user interactive applications can occur prior to, concurrent with, or subsequent to the receipt of the data stream 150.

At block 406, the multimedia device 102 receives the metadata 152 associated with the display stream 150. The metadata 152 may be received at the multimedia device 102 prior to, concurrent with, or subsequent to receipt of the data stream 150. The metadata 152 can be embedded in the display stream 150 or provided to the multimedia device 102 via a separate channel. Alternately, the metadata 152 can be made available to the multimedia device 102 via a portable storage medium, which may include the same portable storage medium used to provide at least one of a software program representative of the user interactive application or the data stream 150. As another example, the metadata 152 can be obtained by the multimedia device 102 as downloadable content downloaded via a network from a FTP server, a web server, or other content server.

At block 408, the multimedia device 102 receives user input via the user input device 134 to instruct the multimedia device 102 to initiate playback of the multimedia content at the display device 104. In response, the display controller 128 accesses the data stream 150 from the storage device 126 and begins processing the accessed data stream 150 to generate corresponding video and audio signaling for the display device 104. As the processing of the data stream 150 progresses, the display controller 128 periodically encounters the time stamps or other time indicators interspersed within the data stream 150. As each time stamp is encountered, the display controller 128 provides a value representative of time stamp to the user interaction controller 130 as part of the progress information 160 so as to inform the user interaction controller 130 of the current position of the playback of the multimedia content.

At block 410 the user interaction controller 130 uses the progress information 160 to determine whether the playback of the multimedia content has progressed to the next on-screen event of interest. When an on-screen event is reached, at block 412 the user interaction controller 130 accesses the storage device 126 to obtain the subset of interactive event information associated with the on-screen event. As discussed above, the interactive event information stored in the storage device 126 includes timing information that correlates certain time points to corresponding subsets of interactive event information, and the user interaction controller 130 therefore can index the corresponding subset of interactive event information based on this timing information and the timing information indicated by the progress information 160 received from the display controller 128 during playback.

At block 414, the user interaction controller 130 uses the accessed subset of interactive event information to identify one or more user interactive events and then perform the one or more user interactive events concurrent with the playback of the corresponding on-screen event. In some instances, the user interactive event to be performed at any given on-screen event may be predetermined and thus the interactive event information would only include information to be used in performing the user interactive event. To illustrate, the user interaction application initiated at block 404 may include an on-screen display application that only provides box scores for the playback of a corresponding sports game. In this context, the only on-screen events of interest may be changes in the score of the game, and thus the OSD application may be configured to dynamically update the displayed scores using score update information included in the metadata 152. In other instances, the interactive event information associated with an on-screen event may include an indicator of one or more user interactive events to perform from a multitude of potential user interactive events, as well as data to be used in performing the one or more user interactive events. The process of blocks 408, 410, 412, and 414 may be repeated for each identified on-screen event until the playback is terminated.

Figure 5:
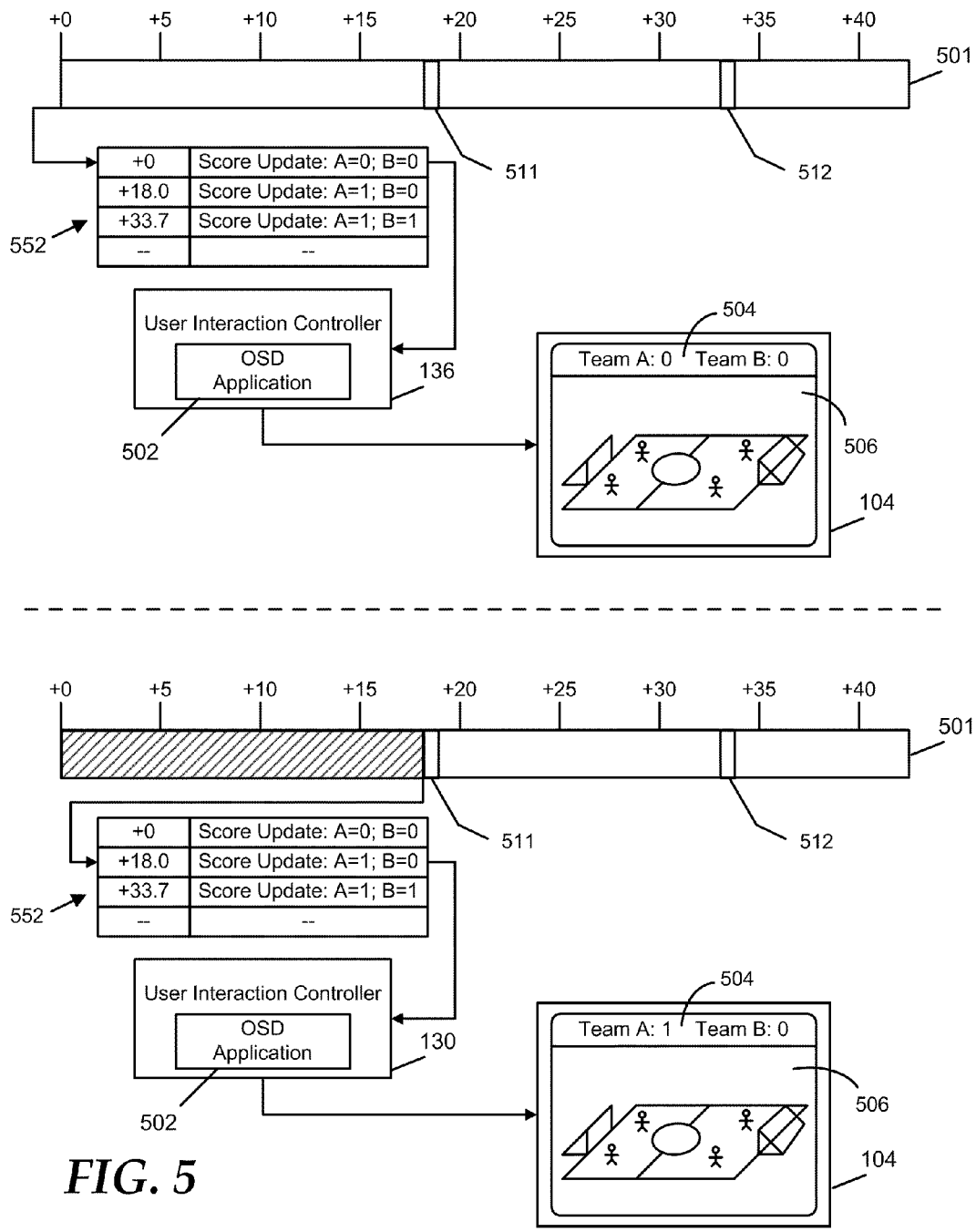
FIG. 5 is a diagram illustrating an example operation of the multimedia system of FIG. 1 in a on-screen display overlay context in accordance with at least one embodiment of the present disclosure.

FIG. 5 illustrates an example operation of the multimedia system 100 in a context whereby the multimedia device 102 implements an on-screen display (OSD) application 502 that provides a dynamically updated OSD overlay 504 that is synchronized to on-screen events in the playback of the multimedia content. In the particular example of FIG. 5, the OSD overlay 504 is displayed at the top border of the display device 104 concurrent with the display of video content 506 of a playback 501 of a soccer game. Further, in the illustrated example, the metadata 152 is organized by the user interaction controller 130 into a table 552 or other data structure that facilitates efficient indexing of the interactive event information of the metadata 152 based on the timing information of the metadata 152.

At illustrated in the top half of FIG. 5, playback 501 of the soccer game is initiated. Using the time point +0 at the initiation of the playback, the user interaction controller 130 indexes the first entry of the table 552 to obtain interactive event information indicating that the current score is 0-0. In response, the OSD application 502 formats the OSD overlay 504 to display a box score of 0-0. As illustrated in the bottom half of FIG. 5, playback 501 of the soccer game progresses to time point +18.0, at which point the on-screen event 511 of Team A scoring a goal occurs. Using this time point, the user interaction controller 130 indexes the second entry of the table 552 to obtain interactive event information indicating that Team A has scored. In response, the OSD application 502 formats the OSD overlay 504 to display a box score of 1-0. This process may be repeated for the score update at time point +33.7 corresponding to the on-screen event 512 of Team B scoring a goal.

The OSD application 502 can be used to provide other information in addition to, or instead of box scores, for corresponding multimedia content. To illustrate, the OSD overlay can be used to provide fantasy sports scoring and player statistics updated in synchronization with on-screen events during playback of a sports game.

Figure 6:
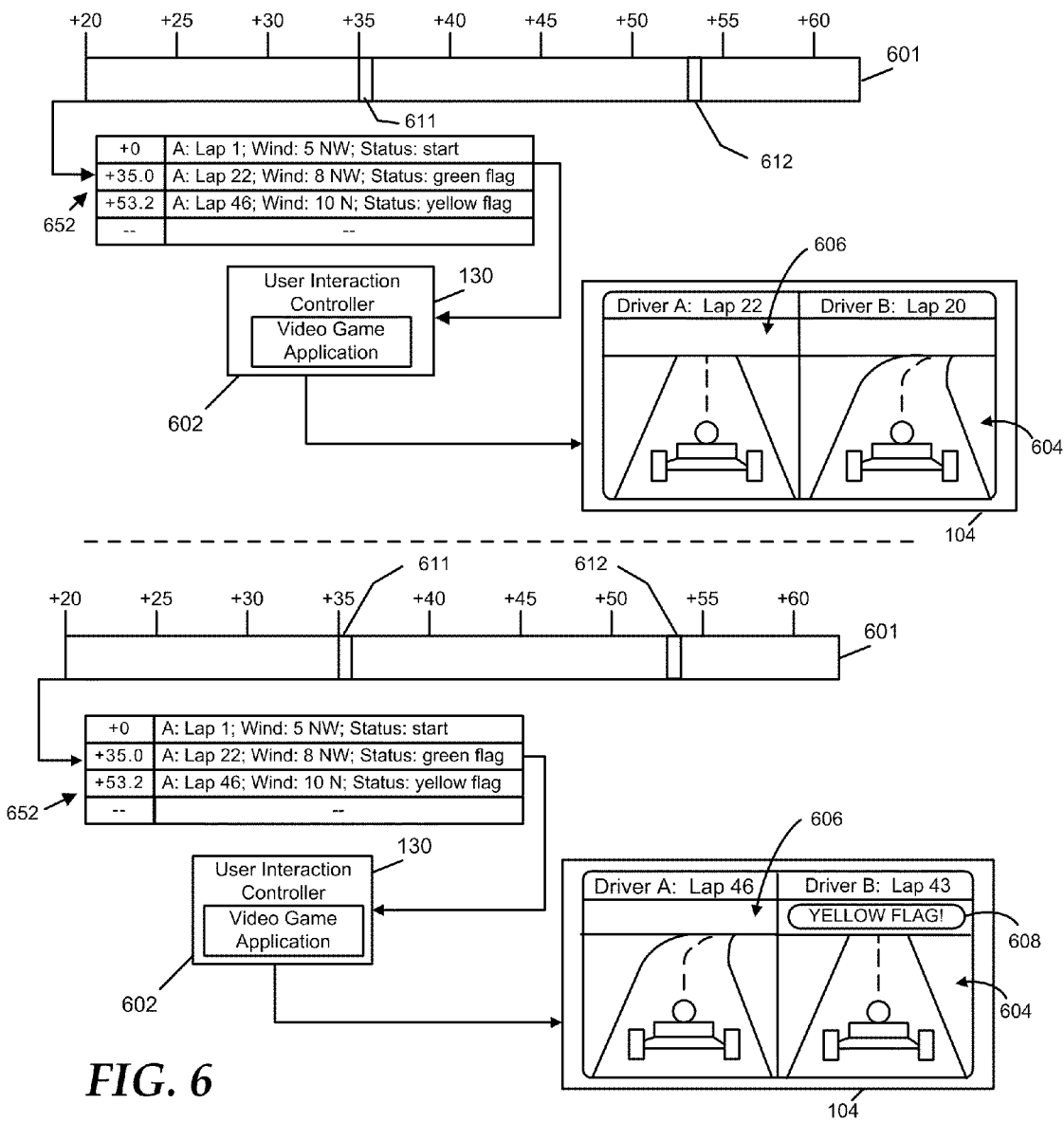
FIG. 6 is a diagram illustrating an example operation of the multimedia system of FIG. 1 in a video game context in accordance with at least one embodiment of the present disclosure.

FIG. 6 illustrates an example operation of the multimedia system 100 in a context whereby the multimedia device 102 implements a video game application 602 that provides a video game experience with gaming situations and other circumstances synchronized to on-screen events in the playback of the multimedia content. In the particular example of FIG. 6, the display area of the display device 104 is split so as to simultaneously display video content 604 from the video game application 602 and video content 606 from a playback 601 of an automotive race. Further, the user is pitted against a well-known professional racer that participated in the actual automotive race being played back by the multimedia device 102. As such, the metadata 152 includes game context information representative of dynamic changes in the circumstances of the automotive race in general such as air temperature, wind speed and direction, and timings of yellow flags, as well as game context information directly related to the professional driver. Examples of game context information can include the fuel status of the professional driver's race car at given points in time, the time at which the professional driver completes each lap, the times during which the professional driver is in a pit stop, and the like. As with the previous example of FIG. 5, the metadata 152 is organized by the user interaction controller 130 into a table 652 or other data structure that facilitates efficient indexing of the interactive event information of the metadata 152 based on the timing information of the metadata 152.

At illustrated in the top half of FIG. 6, playback 601 of the automotive race has already initiated and progressed to the time point +35.0, at which point an on-screen event 611 of the professional driver (Driver A) starting the twenty-second lap occurs in the video content 606 of the playback 601 of the actual race. Using this time point, the video game application 602 indexes the second entry of the table 652 to obtain interactive event information indicating that the professional driver has started the twenty-second lap and that the wind is coming from the northwest (NW) at 8 miles-per-hour (mph). The video game application 602 presents video content 604 emulating the user's race car (Driver B) negotiating the twentieth lap of the race based on user driving control input and whereby the professional driver's lap information is presented in an OSD overlay in the video content 606. Further, the video game application 602 implements the game context information to affect or otherwise control gaming actions provided by the video game application 602, such as using the wind data so as to affect the maximum speed of the user's race car in the video game experience at the current time point.

The playback 601 progresses, as does the emulation of the conditions of the race by the video game application 602 for the user. As illustrated in the bottom half of FIG. 6, playback 601 of the race reaches time point +53.2, at which point an on-screen event 612 of a yellow flag on the course occurs in the video content 606 of the playback 601 of the actual race. Using this time point, the user interaction controller 130 indexes the third entry of the table 652 to obtain interactive event information indicating professional driver has started lap 46, the wind conditions have changed to 10 mph out of the N, and there is a yellow flag on the course. In response, the video game application 602 configures the video content 604 emulating the user's race car at this point, whereby gaming actions taken by the user with respect to the user's race car are reconfigured so as to prevent the user's race car from exceeding a certain speed in view of the yellow flag and the user's race car is affected by the new wind direction and speed, and further whereby the video game application 602 provides a yellow flag icon 608 for display in the video content 604 so as to indicate that a yellow flag is on the course in accordance with the actual car race.

Although one example of a video game application synchronized to the on-screen events of a simultaneously displayed playback of a sports game is illustrated, the video game application is not limited to this example. To illustrate, the video game application could be used to provide the user with an interactive game experience whereby the user is permitted to take game actions so as to play along with, or competes directly with, a professional golfer in a televised golf tournament. In this instance, the video game application could emulate the same conditions encountered by the professional golfer during the tournament. As another example, the video game application could include a musical play-along video game whereby the user's emulated playback of the notes of a song are synchronized to the notes of the same song played by a band during a playback of the band's video recorded concert. Other such synchronized video game experiences can be implemented using the guidelines provided herein without departing from the scope of the present disclosure.

Figure 7:
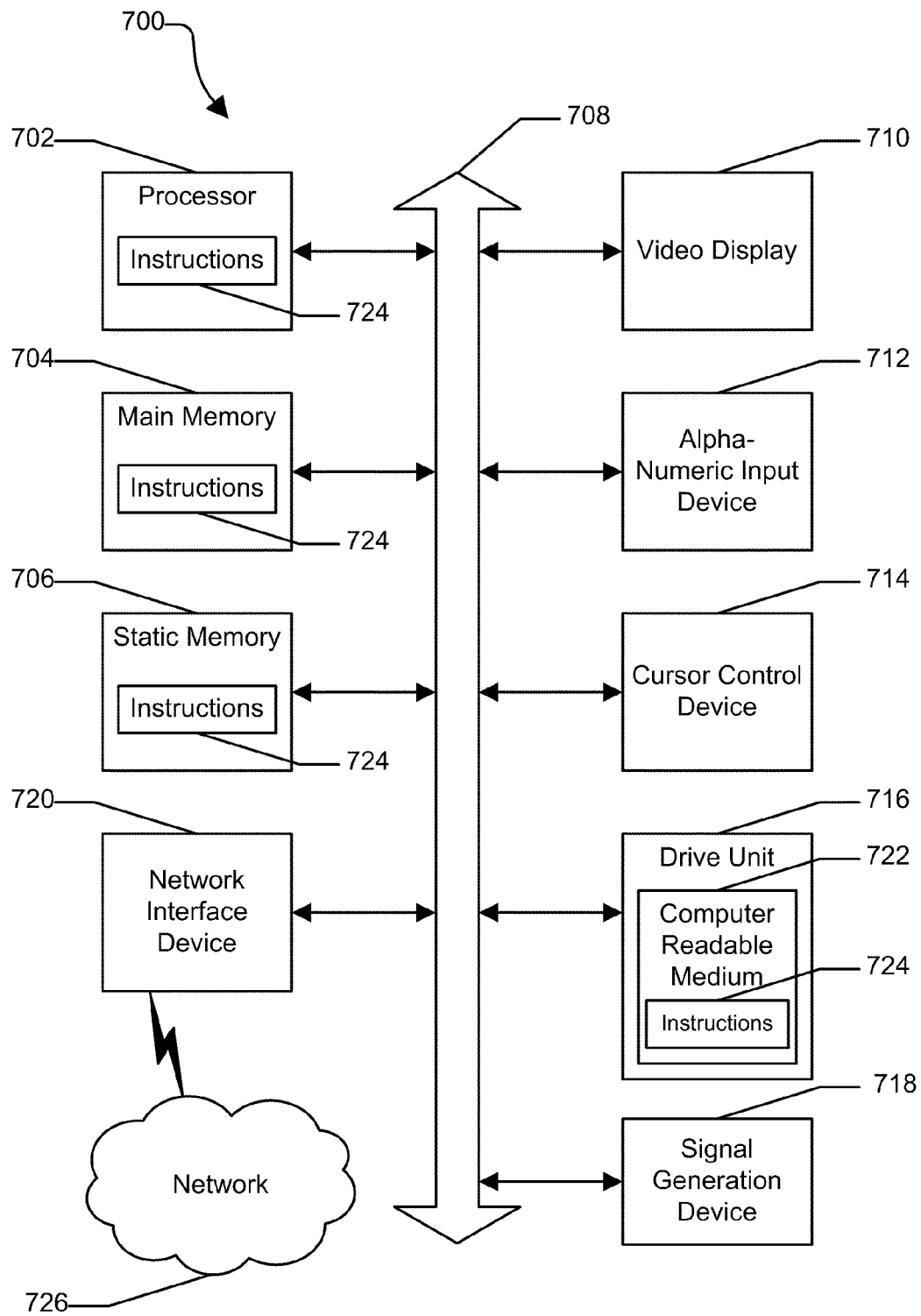
FIG. 7 is a diagram illustrating an example computer system for implementing one or more of the components or techniques described herein in accordance with at least one embodiment of the present disclosure.

FIG. 7 shows an illustrative embodiment of a general computer system 700 in accordance with at least one embodiment of the present disclosure. The computer system 700 can include a set of instructions that can be executed to cause the computer system 700 to perform any one or more of the methods or computer based functions disclosed herein. The computer system 700 may operate as a standalone device or may be connected via a network to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into, for example, a STB device. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, such as a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media. The network interface device 720 can provide connectivity to a network 726, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal, so that a device connected to a network can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writeable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission such as TCP/IP, UDP/IP, HTML, and HTTP represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
   receiving, at a multimedia device, a data stream representing multimedia content, the data stream comprising a first plurality of timing indicators for the multimedia content embedded within and distributed throughout the data stream;
   receiving, at the multimedia device, metadata representing interactive event information associated with the multimedia content, the metadata comprising a second plurality of timing indicators for the interactive event information;
   processing, at the multimedia device, the data stream to provide playback of the multimedia content to a user; and
   during the playback of the multimedia content:
      providing, at the multimedia device, progress of the playback of the multimedia content, wherein the progress of the playback of the multimedia content comprises timing indicators of the first plurality of timing indicators;
      identifying, at the multimedia device, a first user interactive event that is associated with a first time point in the playback of the multimedia content based on the interactive event information;

determining, from the progress of the playback of the multimedia content, when the playback of the multimedia content is approaching the first time point;

determining, at the multimedia device, a subset of the interactive event information that is associated with the first time point based on timing indicators of the second plurality of timing indicators in response to determining, based on the first plurality of timing indicators, that the playback of the multimedia content is approaching the first time point; and performing, at the multimedia device, the first user interactive event concurrent with the first time point in the playback of the multimedia content, wherein synchronization of the first user interactive event and the playback of the multimedia content is maintained when a tuning event or a trickplay event occurs.

2. The method of claim 1, wherein the identifying comprises identifying the first user interactive event from the subset of the interactive event information, and wherein the trickplay event includes a pause, a resume, a fast-forward, a reverse, or a combination thereof.

3. The method of claim 1, wherein the first plurality of timing indicators comprises a first set of time stamps interspersed substantially equally throughout the data stream and the second plurality of timing indicators comprises a second set of time stamps interspersed within the metadata.

4. The method of claim 1, wherein the metadata is received while receiving the data stream, and wherein the first plurality of timing indicators distributed throughout the data stream comprises the first plurality of timing indicators equally interspersed throughout the data stream.

5. The method of claim 1, wherein receiving the metadata at the multimedia device comprises accessing, at the multimedia device, the metadata from a portable storage medium.

6. The method of claim 1, further comprising:

providing, via the multimedia device, a video game application concurrent with the playback of the multimedia content, the video game application providing a video game experience emulating a situation presented in the playback of the multimedia content; and wherein:

the interactive event information comprises game context information for use by the video game application, the game context information associated with multimedia content presented at the first time point; and the first user interactive event comprises a gaming action of the video game application based on the game context information.

7. The method of claim 1, further comprising:

presenting, via the multimedia device, an on-screen display that overlies the playback of the multimedia content, the on-screen display presenting scoring information associated with the multimedia content; and wherein:

the interactive event information comprises updated scoring information associated with the multimedia content presented at the first time point; and the first user interactive event comprises updating the on-screen display to reflect the updated scoring information.

8. The method of claim 1, further comprising:

during the playback of the multimedia content:

identifying, at the multimedia device, a second user interactive event based on the interactive event information that is associated with a second time point in the playback of the multimedia content;

determining, from the progress of playback of the multimedia content, when playback of the multimedia content is approaching the first time point; and performing, at the multimedia device, the second user interactive event concurrent with the second time point in the playback of the multimedia content.

9. The method of claim 3, wherein the time stamps of the first set and the second set comprise time stamps synchronized to coordinated universal time.

10. The method of claim 4, wherein the metadata is embedded in the data stream.

11. The method of claim 4, wherein receiving the metadata at the multimedia device comprises accessing the metadata from an external source via a network responsive to initiation of the playback of the multimedia content at the multimedia device.

12. A multimedia device comprising:

a first interface to receive a data stream representing multimedia content, the data stream comprising a first plurality of timing indicators for the multimedia content embedded within and distributed by the data stream, timing indicators of the first plurality of timing indicators providing an indication of playback progress of the multimedia content;

a second interface to receive metadata representing interactive event information associated with the multimedia content, the metadata comprising a second plurality of timing indicators for the interactive event information;

a display controller to process the data stream to provide playback of the multimedia content to a user and to provide progress of the playback of the multimedia content as determined from timing indicators of the first plurality of timing indicators; and a user interaction controller to identify, during the playback of the multimedia content, a first user interactive event that is associated with a first time point in the playback of the multimedia content based on the interactive event information, the user interaction controller to detect progress of playback of the multimedia content approaching the first time point, the user interaction controller to determine a subset of the interactive event information that is associated with the first time point based on timing indicators of the second plurality of timing indicators in response to determining, based on the first plurality of timing indicators, that the playback of the multimedia content is approaching the first time point, and the user interaction controller to control a performance of the first user interactive event concurrent with the first time point in the playback of the multimedia content, wherein synchronization of the first user interactive event and the playback of the multimedia content is maintained when a tuning event or a trickplay event occurs.

13. The multimedia device of claim 12, wherein the user interaction controller identifies the first user interactive event from the subset of the interactive event information, and wherein the trickplay event includes a pause, a resume, a fast-forward, a reverse, or a combination thereof.

14. The multimedia device of claim 12, wherein the first plurality of timing indicators comprises a first set of time stamps interspersed substantially equally throughout the data stream and the second plurality of timing indicators comprises a second set of time stamps interspersed within the metadata.

15. The multimedia device of claim 12, further comprising:
a portable storage interface to interface with a portable storage medium, the portable storage medium storing the metadata.

16. The multimedia device of claim 12, further comprising:
a storage device to store executable instructions for a video game application; and
a processor to execute the executable instructions to provide video game experience emulating a situation presented in the playback of the multimedia content concurrent with the playback of the multimedia content; and
wherein:
the interactive event information comprises game context information for use by the video game application, the game context information associated with the multimedia content presented at the first time point; and
the first user interactive event comprises a gaming action of the video game application based on the game context information.

17. The multimedia device of claim 12, further comprising:
a storage device to store executable instructions for an on-screen display application; and
a processor to execute the executable instructions to provide an on-screen display that overlies the playback of the multimedia content, the on-screen display presenting scoring information associated with the multimedia content; and
wherein:
the interactive event information comprises updated scoring information associated with the multimedia content presented at the first time point; and
the first user interactive event comprises updating the on-screen display to reflect the updated scoring information.

18. A video game console comprising:
a first interface to receive a data stream representing multimedia content, the data stream comprising a first plurality of timing indicators for the multimedia content, embedded within and distributed by the data stream;
a second interface to receive metadata representing game context information associated with the multimedia content, the metadata comprising a second plurality of timing indicators for interactive event information;
a display controller to process the data stream to provide a playback of the multimedia content and to provide progress of playback of the multimedia content as determined from timing indicators of the first plurality of timing indicators;
a storage component to store a software program comprising a set of executable instructions representative of a video game application; and
a processor to execute the software program to present a video game experience to a user concurrent with the playback of the multimedia content, the video game experience emulating a situation concurrently presented in the playback of the multimedia content;
the set of executable instructions being configured to manipulate the processor to synchronize gaming actions of the video game experience to corresponding time points in the playback of the multimedia content based on the first plurality of timing indicators and the second plurality of timing indicators,
wherein the processor determines, during the playback of the multimedia content, from the progress of the playback of the multimedia content, when the playback of the multimedia content is approaching a first time point associated with a first gaming action, and
wherein synchronization of the first gaming action and the playback of the multimedia content is maintained when a tuning event or a trickplay event occurs.

19. The video game console of claim 18, wherein:
the metadata is stored on a portable storage medium; and
the second interface comprises a portable storage interface to access the metadata from the portable storage medium.

20. A method comprising:
generating, at a multimedia distribution system, a data stream representing multimedia content, the data stream comprising a first plurality of timing indicators for the multimedia content embedded within and distributed by the data stream, timing indicators of the first plurality of timing indicators providing an indication of progress during playback of the multimedia content;
determining, at the multimedia distribution system, a set of time points in playback of the multimedia content that correspond to identified on-screen events in the multimedia content;
determining, at the multimedia distribution system, interactive event information for each of the identified on-screen events;
generating, at the multimedia distribution system, metadata comprising the interactive event information for the identified events, the metadata further comprising a second plurality of timing indicators associating a time point of an identified on-screen event with corresponding interactive event information;
providing the data stream to a multimedia device; and
providing the metadata to the multimedia device,
wherein the multimedia device determines, during the playback of the multimedia content, from the progress of the playback of the multimedia content, when the playback of the multimedia content is approaching the time point of the identified on-screen event, and
wherein synchronization of the interactive event and the playback of the multimedia content is maintained when a tuning event or a trickplay event occurs.

21. The method of claim 20, wherein the interactive event information comprises score update information for use by an on-screen display overlay at the multimedia device.

22. The method of claim 20, wherein the interactive event information comprises game context information for use by a video game application at the multimedia device.

* * * * *